US010873430B2

(12) United States Patent
Guo et al.

(10) Patent No.: US 10,873,430 B2
(45) Date of Patent: Dec. 22, 2020

(54) SIGNAL SENDING METHOD AND APPARATUS

(71) Applicant: HUAWEI TECHNOLOGIES CO., LTD., Guangdong (CN)

(72) Inventors: Zhiheng Guo, Beijing (CN); Xinqian Xie, Beijing (CN); Wei Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/365,227

(22) Filed: Mar. 26, 2019

(65) Prior Publication Data

US 2019/0222372 A1 Jul. 18, 2019

Related U.S. Application Data

(63) Continuation of application No. PCT/CN2017/102922, filed on Sep. 22, 2017.

(30) Foreign Application Priority Data

Sep. 27, 2016 (CN) .......................... 2016 1 0852680

(51) Int. Cl.
*H04L 5/00* (2006.01)
*H04W 72/02* (2009.01)
(Continued)

(52) U.S. Cl.
CPC .......... *H04L 5/0021* (2013.01); *H04L 1/1657* (2013.01); *H04L 5/0007* (2013.01);
(Continued)

(58) Field of Classification Search
CPC ... H04L 5/0021; H04L 1/1657; H04L 5/0007; H04L 5/0055; H04L 25/0226;
(Continued)

(56) References Cited

U.S. PATENT DOCUMENTS

2010/0202400 A1 8/2010 Richardson et al.
2013/0039387 A1* 2/2013 Qu ........................ H04L 5/0023 375/141
2017/0104561 A1* 4/2017 Agardh .................. H04L 5/005

FOREIGN PATENT DOCUMENTS

CN 101720093 A 6/2010
CN 102318421 A 1/2012
EP 2924908 A1 9/2015

OTHER PUBLICATIONS

PCT International Search Report and Written Opinion issued in International Application No. PCT/CN2017/102922 dated Dec. 28, 2017, 18 pages (with English translation).

(Continued)

*Primary Examiner* — Ivan O Latorre
(74) *Attorney, Agent, or Firm* — Fish & Richardson P.C.

(57) ABSTRACT

Example methods and apparatus for sending a signal are described. One method includes determining a to-be-sent first signal by a first terminal and determining a first time-frequency resource. Some or all of the first time-frequency resource are second time-frequency resources, and the second time-frequency resource is a time-frequency resource used to send a second signal. The first signal is sent by the first terminal by using the first time-frequency resource, where the first time-frequency resource includes an idle time-frequency resource that is not occupied by the second signal. The first time-frequency resource can also include a common time-frequency resource occupied by the second signal, and the first signal is orthogonal to the second signal in the common time-frequency resource.

15 Claims, 5 Drawing Sheets

A network device sends, to a second terminal device by using a fourth time-frequency resource, a downlink data channel used to carry first emergency service data — 201

A first terminal device determines a to-be-sent first signal — 202

The first terminal device determines the fourth time-frequency resource — 203

The first terminal device determines a first time-frequency resource based on the fourth time-frequency resource — 204

The first terminal device sends the first signal by using the first time-frequency resource, where the first signal is orthogonal to a second signal in the first time-frequency resource — 205

(51) Int. Cl.
*H04W 72/10* (2009.01)
*H04L 1/16* (2006.01)
*H04L 25/02* (2006.01)

(52) U.S. Cl.
CPC ........ *H04L 5/0055* (2013.01); *H04L 25/0226* (2013.01); *H04W 72/02* (2013.01); *H04W 72/10* (2013.01)

(58) Field of Classification Search
CPC ..... H04W 72/02; H04W 72/10; H04W 28/18; H04W 72/0446; H04W 72/0453
See application file for complete search history.

(56) References Cited

OTHER PUBLICATIONS

Extended European Search Report issued in European Application No. 17854770.9 dated Jul. 12, 2019, 7 pages.
R1-163993—Samsung, "Non-Orthogonal Multiple Access Considerations for NR," 3GPP TSG RAN WG1 #85, Nanjing, China, May 23-27, 2016, XP051096631, 4 pages.
R1-166756—Samsung, "Discussion on UL control channel structure for NR," 3GPP TSG RAN WG1 #86, Gothenburg, Sweden, Aug. 22-26, 2016, XP051140363, 4 pages.

* cited by examiner

SIGNAL SENDING METHOD AND APPARATUS

CROSS-REFERENCE TO RELATED APPLICATIONS

This application is an continuation of International Application No. PCT/CN2017/102922, filed on Sep. 22, 2017, which claims priority to Chinese Patent Application No. 201610852680.9, filed on Sep. 27, 2016. The disclosures of the aforementioned applications are hereby incorporated by reference in their entireties.

TECHNICAL FIELD

This application relates to the wireless communications field, and in particular, to a signal sending method and apparatus.

BACKGROUND

In a wireless communications system, after generating an uplink transmission requirement for sending uplink data to a network device, a terminal needs to first wait for a time-frequency resource that is reserved for the terminal and that is used to send an uplink scheduling request, and then sends the uplink scheduling request to the network device. After receiving the uplink scheduling request, the network device allocates a time-frequency resource used for data transmission to the terminal, and notifies, by using uplink scheduling information, the terminal of the time-frequency resource allocated to the terminal. After obtaining the uplink scheduling information, the terminal performs uplink data transmission by using the time-frequency resource allocated by the network device to the terminal.

However, in an LTE system, the terminal can send the uplink scheduling request only on a time-frequency resource that is pre-allocated to the terminal for sending the uplink scheduling request. If there are a relatively small quantity of time-frequency resources pre-allocated to the terminal for sending the uplink scheduling request, it is very likely that after generating the uplink transmission requirement, the terminal can send the uplink scheduling request only after a relatively long time, thereby adversely affecting a data transmission latency of the terminal. However, if there are a relatively large quantity of time-frequency resources pre-allocated to the terminal for sending the uplink scheduling request, utilization of the time-frequency resources allocated for sending the uplink scheduling request is relatively low, thereby causing an unnecessary resource waste.

SUMMARY

This application provides a signal sending method terminal and apparatus, to reduce a data transmission latency caused by improper resource allocation.

According to a first aspect, this application provides a signal sending method, including: determining, by a first terminal, a to-be-sent first signal; determining, by the first terminal, a first time-frequency resource, where some or all of the first time-frequency resource are second time-frequency resources, and the second time-frequency resource is a time-frequency resource used to send a second signal; and sending, by the first terminal, the first signal by using the first time-frequency resource, where the first time-frequency resource includes an idle time-frequency resource that is not occupied by the second signal; and/or the first time-frequency resource includes a common time-frequency resource occupied by the second signal, and the first signal is orthogonal to the second signal in the common time-frequency resource. The determining, by the first terminal, a first time-frequency resource may include: determining, by the first terminal, a fourth time-frequency resource; and then determining the first time-frequency resource based on the fourth time-frequency resource, where the fourth time-frequency resource is a time-frequency resource used by a network device to transmit a first emergency service, and the first time-frequency resource may be a time-frequency resource used to transmit a transmission feedback signal of the first emergency service.

With reference to the first aspect, in a first possible implementation of the first aspect, both the first signal and the second signal are sequence signals, and a third signal is orthogonal to a fourth signal, where the third signal is a part that is of the first signal and that is sent by the first terminal on the common time-frequency resource, and the fourth signal is a part that is of the second signal and that is sent by a second terminal on the common time-frequency resource.

With reference to the first aspect, in a second possible implementation of the first aspect, the first signal is a signal obtained after extension is performed by using a first code division multiplexing (CDM) code, the second signal is a signal obtained after extension is performed by using a second CDM code, and the first CDM code and the second CDM code are orthogonal codes.

With reference to the first aspect, or any one of the first and the second possible implementations of the first aspect, in a third possible implementation of the first aspect, a signal type of the first signal includes at least one of an acknowledgement (ACK), a negative acknowledgement (NACK), and a scheduling request signal.

With reference to the third possible implementation of the first aspect, in a fourth possible implementation of the first aspect, a signal type of the second signal includes at least one of an acknowledgement (ACK), a negative acknowledgement (NACK), a scheduling request signal, a sounding reference signal (SRS), and a pilot signal.

With reference to the fourth possible implementation of the first aspect, in a fifth possible implementation of the first aspect, the second signal is a signal sent by the first terminal, and the signal type of the first signal is different from the signal type of the second signal; and/or the second signal is a signal sent by the second terminal, and the signal type of the first signal is the same as or different from the signal type of the second signal.

According to a second aspect, this application provides a signal sending apparatus, and the signal sending apparatus may be a terminal or a chip in a terminal. The signal sending apparatus has a function of implementing the signal sending method in any one of the possible implementations of the first aspect. The function may be implemented by hardware, or may be implemented by hardware by executing corresponding software. The hardware or the software includes one or more units corresponding to the foregoing function.

With reference to the second aspect, in a first possible implementation of the second aspect, when the signal sending apparatus is a terminal, the terminal includes a processing unit and a transceiver unit. The processing unit may be a processor, the transceiver unit may be a transceiver, and the transceiver includes a radio frequency circuit. Optionally, the terminal further includes a storage unit, for example, the storage unit may be a memory. When the terminal includes the storage unit, the storage unit is configured to store a computer executable instruction, the processing unit is connected to the storage unit, and the processing unit executes the computer executable instruction stored in the storage unit, so that the terminal performs the signal sending method in any one of the possible implementations of the first aspect.

With reference to the second aspect, in a second possible implementation of the second aspect, when the signal sending apparatus is a chip in a terminal, the chip includes a processing unit and a transceiver unit. The processing unit may be a processor, and the transceiver unit may be an input/output interface, a pin, a circuit, or the like on the chip. The processing unit may execute a computer executable instruction stored in a storage unit, so that the chip in the terminal performs the signal sending method in any one of the possible implementations of the first aspect. Optionally, the storage unit may be a storage unit (for example, a register or a buffer) in the chip, or the storage unit may be a storage unit (for example, a read-only memory (ROM)) that is in the terminal and that is outside the chip, another type of static storage device (for example, a random access memory (RAM)) that may store static information and an instruction, or the like.

The processor mentioned in the second aspect may be a central processing unit (CPU), a microprocessor, or an application-specific integrated circuit (ASIC), or may be one or more integrated circuits configured to control program execution of the signal sending method in any one of the possible implementations of the first aspect.

According to a third aspect, a communications system is provided. The communications system includes the signal sending apparatus in any one of the possible implementations of the second aspect and a network device.

According to a fourth aspect, this application further provides a computer storage medium. The computer storage medium may store a program, and when the program is executed, some or all of the steps in the embodiments of the signal sending method provided in this application may be performed.

According to the technical solutions provided in this application, after generating a requirement for sending an uplink signal, the first terminal can independently acknowledge an uplink resource for signal sending without a need to wait for a time-frequency resource that is allocated by the network device to the first terminal and that is dedicated to sending of the first signal, so that a time from occurrence of an uplink data transmission requirement to an actual start of uplink data transmission can be effectively reduced.

BRIEF DESCRIPTION OF DRAWINGS

To describe the technical solutions in this application more clearly, the following briefly describes the accompanying drawings required for describing the embodiments. Apparently, a person of ordinary skill in the art may derive other drawings from these accompanying drawings without creative efforts.

DESCRIPTION OF EMBODIMENTS

Figure 1:
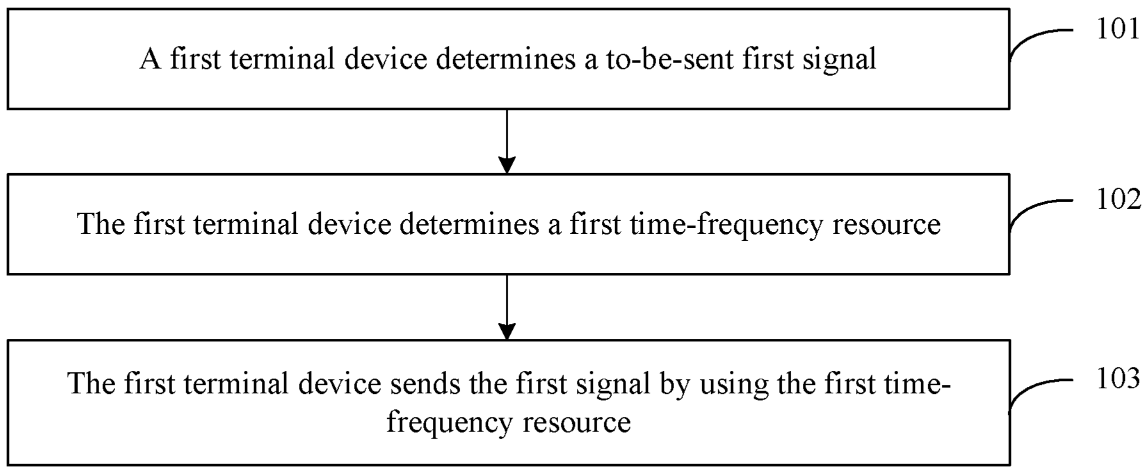
FIG. 1 is a schematic flowchart of an embodiment of a signal sending method in this application.

A terminal in the embodiments of the present invention may be a device that provides a user with voice and/or data connectivity, a handheld device with a radio connection function, or another processing device connected to a radio modem. The terminal may communicate with one or more core networks by using a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal, a user terminal, a user agent, a user device, or user equipment.

A network device in the embodiments of the present invention may be a base station or an access point, or may be a device that is in an access network and that communicates with the wireless terminal by using one or more sectors over an air interface. The base station may be configured to mutually convert a received over-the-air frame and an IP packet and serve as a router between the wireless terminal and a rest portion of the access network, and the rest portion of the access network may include an Internet protocol (IP) network. The base station may further coordinate attribute management of the air interface. For example, the base station may be a base transceiver station (BTS) in GSM or CDMA, may be a NodeB (NodeB) in WCDMA, or may be an evolved NodeB (eNodeB) in LTE. This is not limited in this application. However, for ease of description, the following embodiments are described by using an eNodeB eNB and user equipment UE as examples.

With continuous development and evolution of communications technologies, an increasing quantity of technicians start to research 5th Generation (5G) communications technologies. A 5th Generation communications system supports a higher carrier, higher bandwidth, more aggregated carriers, and a more flexible subframe structure, supports a flexible subcarrier spacing and transmission time interval (TTI) length, and supports more flexible resource scheduling.

The 5G system may need to support three main types of communications services: an enhanced mobile broadband (eMBB) service, a massive machine type communications (mMTC) service, and an ultra-reliable and low latency communications (URLLC) service.

Implementation of the eMBB service requires high spectrum efficiency and high bandwidth, and requires a high transmission rate between the terminal and the network device. Implementation of the mMTC service requires the network device to support a relatively large quantity of concurrent connections, and the mMTC service is usually small-sized traffic that is not sensitive to a latency. The URLLC service has a very high requirement on transmission reliability and a transmission latency, and requires transmission reliability of 99.999% within 1 millisecond, and is usually a burst emergency service. For the URLLC service, a time-frequency resource used to send URLLC service data is required at all times, to meet a transmission latency requirement of the URLLC service. In implementations of the present invention, the emergency service may be a service that is sensitive to a transmission latency, for example, the URLLC service. The transmission latency is a latency generated from a time at which service data arrives at a buffer at a Media Access Control (MAC) layer of a transmit end to a time at which a receive end correctly demodulates and decodes the data and returns demodulated and decoded input to a MAC layer of the receive end. A common service is a service that has a lower transmission latency requirement than the emergency service.

In embodiments of this application, a first terminal may be any terminal in any cell, and a second terminal and the first terminal may be different terminals or a same terminal. When the second terminal and the first terminal are different terminals, the second terminal and the first terminal may usually have a same service attribute. Both the first terminal and the second terminal may be terminals in the 5G system.

In the embodiments of this application, a first signal is a signal that is sent by or needs to be sent by the first terminal. The first signal may be a dedicated signal of the first terminal, for example, a scheduling request (SR) signal or a transmission feedback signal. A second signal is a signal that is sent by or needs to be sent by the second terminal, for example, a transmission feedback signal, a scheduling request signal, a sounding reference signal (SRS), a demodulation reference signal (DMRS), or a pilot signal. When the first terminal and the second terminal are a same terminal, the first signal and the second signal are signals of different types. The scheduling request signal is used by the terminal to request uplink scheduling from the network device. The transmission feedback signal includes an acknowledgement (ACK) signal or a negative acknowledgment (NACK) signal. The acknowledgement signal is used by the terminal to inform, after the terminal receives a downlink data channel, the network device that the downlink data channel has been correctly received, and the negative acknowledgment is used by the terminal to inform, after the terminal receives a downlink data channel, the network device that the downlink data channel has not been correctly received.

In the embodiments of this application, a first time-frequency resource is a time-frequency resource that is independently determined by the terminal and that is used to send the first signal, other than a time-frequency resource that is allocated by the network device to the first terminal and that is dedicated to sending of the first signal. A second time-frequency resource is a time-frequency resource that is in a time-frequency resource allocated by the network device to the second terminal and that can be used to send the second signal. The first time-frequency resource may be any other time-frequency resource that can be used to send the first signal and that is in a cell to which the first terminal belongs, other than the time-frequency resource that is allocated by the network device and that is dedicated to sending of the first signal. The first time-frequency resource may be the second time-frequency resource or a time-frequency resource that is not allocated by the network device for use, or at least a part of the first time-frequency resource is the second time-frequency resource or a time-frequency resource that is not allocated by the network device for use. For example, the at least part of the first time-frequency resource may be a time-frequency resource allocated for transmitting an ACK or a NACK of the second terminal, a time-frequency resource allocated for transmitting an SRS of the second terminal, a time-frequency resource allocated for transmitting a DMRS of the second terminal, or a time-frequency resource reserved for SRS transmission.

FIG. 1 is a flowchart of an embodiment of a signal sending method in this application. The method includes the following steps.

Step 101: A first terminal determines a to-be-sent first signal.

The first terminal first determines the to-be-sent first signal. The first signal may be generated by the first terminal, or may be generated by another terminal and sent to the first terminal. A process in which the first terminal determines the first signal is not described in detail herein.

Because a first time-frequency resource is not a time-frequency resource that is allocated by a network device to the first terminal and that is dedicated to sending of the first signal, the first signal may include a source indication used to indicate that the first signal is from the first terminal, so that the network device can learn, after receiving the first signal, that the first signal is from the first terminal. For example, the first signal may include the source indication in addition to information used to indicate that the first signal is a scheduling request signal or a transmission feedback signal.

The source indication may be related information carried in an explicit bearer manner, for example, a terminal ID carried in the first signal. The source indication may alternatively be related information carried in an implicit bearer manner. For example, the first signal sent by the first terminal or a manner of sending the first signal is preallocated by the network device, so that the network device can learn, after identifying the first signal, that the first signal is sent by the first terminal.

Step 102: The first terminal determines a first time-frequency resource.

In addition to the first signal, the first terminal needs to determine the first time-frequency resource that can be used to send the first signal. The first terminal may continuously monitor the first time-frequency resource after being enabled or after receiving a monitoring instruction; or may start to monitor the first time-frequency resource after generating a requirement for transmitting the first signal, and determine, based on a monitoring result, whether there is the first time-frequency resource. Therefore, a sequence of performing step 101 and step 102 is not limited in this application.

A time domain position and a frequency domain position of the first time-frequency resource are determined in a plurality of manners. The first terminal may determine the time domain position and the frequency domain position in a same way, or may separately determine the time domain position and the frequency domain position in different ways.

Generally, the first terminal may determine the first time-frequency resource by monitoring a downlink control channel. The first terminal may determine both the time domain position and the frequency domain position of the first time-frequency resource by monitoring the downlink control channel, or may determine the time domain position of the first time-frequency resource by monitoring the downlink control channel, and obtain the frequency domain position of the first time-frequency resource by using system information or first terminal-specific (UE-specific) signaling, or may determine, by interpreting downlink control signaling or higher layer signaling, a time domain resource and a frequency domain resource that are not used in a cell to which the first terminal belongs, to determine the time domain position and the frequency domain position of the first time-frequency resource.

It should be noted herein that if the first terminal starts to monitor the first time-frequency resource only after generating the requirement for transmitting the first signal, after starting to transmit the first signal or after the first signal has been transmitted, the first terminal may stop a process of monitoring the first time-frequency resource, and may not restart monitoring the first time-frequency resource until the requirement for transmitting the first signal is generated again, to reduce a data processing amount, and reduce power consumption caused by unnecessary monitoring.

Step 103: The first terminal sends the first signal by using the first time-frequency resource.

After determining both the first signal and the first time-frequency resource, the first terminal may send the first signal by using the first time-frequency resource. It can be learned from the foregoing content that there may be two types of first time-frequency resources: One type is that the first time-frequency resource includes a second time-frequency resource, and the other type is that the first time-frequency resource does not include the second time-frequency resource. A specific sending manner in which the first terminal sends the first signal may vary with different types of first time-frequency resources.

When some or all of the first time-frequency resource are second time-frequency resources, a second terminal also sends a second signal by using the second time-frequency resource. Therefore, when sending the first signal by using the first time-frequency resource, the first terminal needs to use a sending manner that is the same as or similar to a manner in which the second terminal sends the second signal and that can be used to distinguish between the first signal and the second signal, to avoid mutual interference between the first signal and the second signal.

Optionally, a fact that the second terminal sends the second signal in a form of a sequence signal may be preset, and a fact that the first terminal also sends the first signal in a form of a sequence signal may be preset.

A part (namely, a third signal) that is of the first signal and that is sent on a common time-frequency resource and a part (namely, a fourth signal) that is of the second signal and that is sent on the common time-frequency resource are orthogonal to each other, so that the network device can distinguish between the first signal and the second signal. When both the first signal and the second signal are sent on the common time-frequency resource, the first signal needs to be orthogonal to the second signal. Because the third signal is orthogonal to the fourth signal, the network device can distinguish the third signal and the fourth signal from received signals, to distinguish between the first signal and the second signal.

A first sequence signal may be a sequence signal allocated by the network device to the first terminal for dedicated use. In other words, the first sequence signal is used only by the first terminal from a time at which the network device allocates the first sequence signal to the first terminal to a time at which the network device instructs the first terminal to stop using the first sequence signal. The first sequence signal is corresponding to the first terminal, and the first sequence signal varies with different first terminals. A second sequence signal is a sequence signal that is allocated by the network device to the second terminal and that is used when the second terminal uses the second time-frequency resource. The second sequence signal is corresponding to the second time-frequency resource, and the second sequence signal varies with different second time-frequency resources.

It should be noted herein that when both the first sequence signal and the second sequence signal are pre-allocated by the network device, the network device may further determine sources of the first signal and the second signal based on the sequence signal, so that both the first signal and the second signal no longer carry the source indication in an explicit bearer manner.

Optionally, the network device may pre-allocate a first code division multiplexing (CDM) code to the first terminal, and pre-allocate a second CDM code to the second terminal, where the first CDM code is orthogonal to the second CDM code, so that the network device can distinguish between the first signal and the second signal, and determine the sources of the first signal and the second signal.

The first CDM code may be a CDM code allocated by the network device to the first terminal for dedicated use. In other words, the first CDM code is used only by the first terminal from a time at which the network device allocates the first CDM code to the first terminal to a time at which the network device instructs the first terminal to stop using the first CDM code. The second CDM code is a CDM code that is allocated by the network device to the second terminal and that is used when the second terminal sends the second signal by using the second time-frequency resource.

When sending the first signal, the first terminal extends the first signal by using the first CDM code, and when sending the second signal, the second terminal extends the second signal by using the second CDM code. Because the first signal and the second signal are extended separately by using different CDM codes, the network device can distinguish between the first signal and the second signal based on the different CDM codes. When both the first CDM code and the second CDM code are pre-allocated by the network device, the network device may further determine the sources of the first signal and the second signal based on the CDM codes, so that neither the first signal nor the second signal needs to carry the source indication in an explicit bearer manner.

It should be noted herein that the extending the first signal may not only include extending the first signal in frequency domain, but also include extending the first signal in time domain. Similarly, the extending the second signal may not only include extending the second signal in frequency domain, but also include extending the second signal in time domain.

Optionally, the network device may not allocate a CDM code to the first terminal, and the first terminal may obtain an available code domain resource by using cell-specific signaling and/or group-specific signaling. The first terminal may further determine CDM code usage in the first time-frequency resource by monitoring downlink control signaling, and use an unused CDM code as a CDM code used when the first terminal occupies the first time-frequency resource.

When the first time-frequency resource does not include the second time-frequency resource, in other words, the first time-frequency resource includes only a time-frequency resource that is not allocated by the network device for use, the first terminal first performs listening to determine whether there is an uplink signal that is being sent on the first time-frequency resource, and if there is no uplink signal that is being sent on the first time-frequency resource, the first terminal may directly send the first signal by using the first time-frequency resource in a sending manner that is the same as or similar to a manner of sending the first signal by using the first time-frequency resource.

It should be noted herein that when all of the first time-frequency resource are time-frequency resources that are not allocated for use and the first signal is not pre-allocated by the network device, the first signal needs to carry the source indication in an explicit bearer manner, so that the network device can determine a signal source of the first signal after receiving the first signal, in other words, the network device can determine that the first signal is sent by the first terminal.

In actual use, the first time-frequency resource monitored by the first terminal may include more than one time-frequency resource block that is not associated with each other in time domain or in frequency domain, and each time-frequency resource block may be independently used to send the first signal. Therefore, when the first time-frequency resource includes more than one time-frequency resource block, the first terminal may send the uplink signal by using any one of the resource blocks. To further reduce a transmission latency, the first terminal may send the first signal by using a first usable time-frequency resource block, and the first usable time-frequency resource block is a time-frequency resource block with a most front time domain position that is in the more than one time-frequency resource block included in the first time-frequency resource.

It should be further noted herein that because the first time-frequency resource is independently selected by the first terminal from the time-frequency resource that can be used to transmit the first signal, instead of being specified by the network device, the network device may not accurately determine the time domain position and the frequency domain position of the first time-frequency resource. The network device can detect or monitor the first signal on all time-frequency resources that can be used to send the first signal, to ensure that the network device can receive the first signal.

According to the method provided in this embodiment, after generating a requirement for sending an uplink signal, the first terminal can independently use an additional uplink resource for signal sending without a need to wait for a time-frequency resource that is allocated by the network device to the first terminal and that is dedicated to sending of the first signal, so that a time from occurrence of an uplink data transmission requirement to an actual start of uplink data transmission can be effectively reduced.

The signal sending method in this application is further described below with reference to specific examples.

Figure 2:
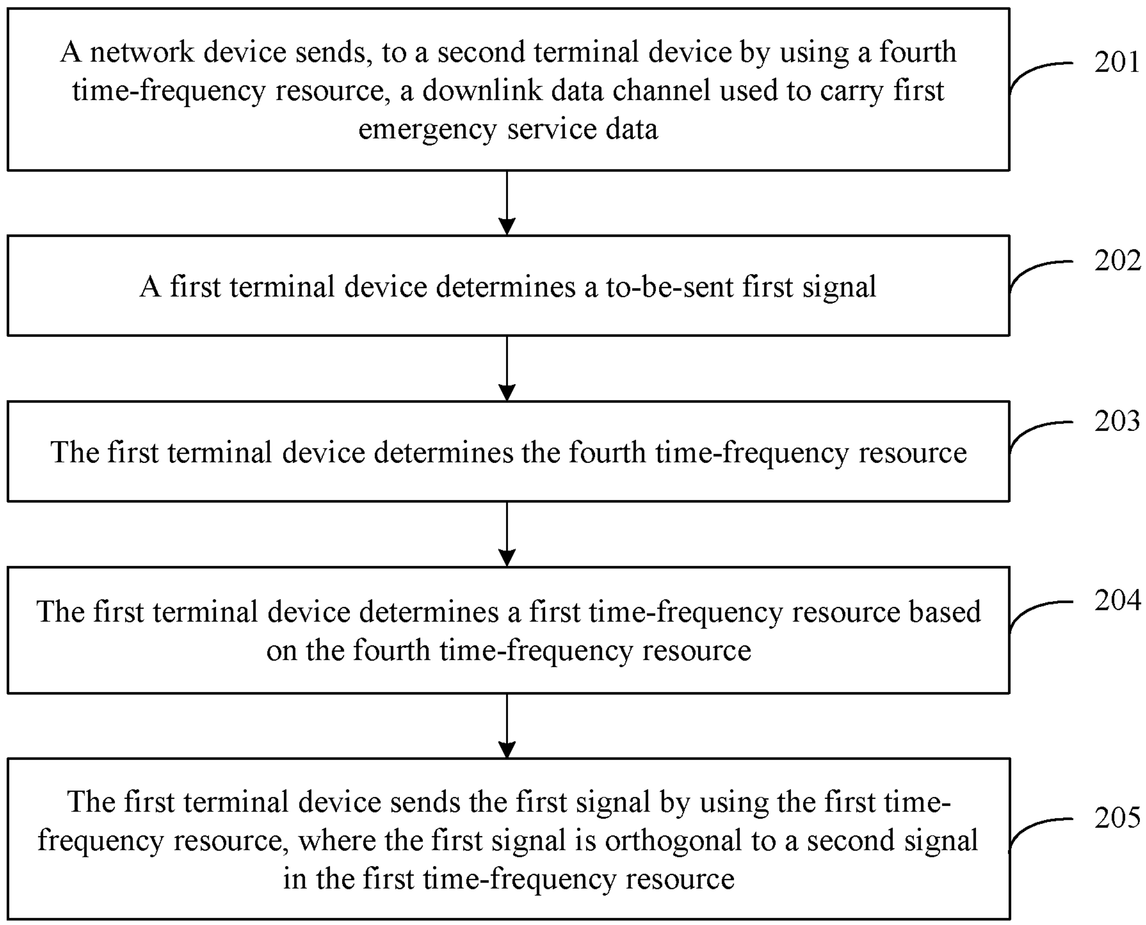
FIG. 2 is a schematic flowchart of another embodiment of a signal sending method in this application.

FIG. 2 is a schematic flowchart of another embodiment of a data transmission method in this application.

Step 201: A network device sends, to a second terminal by using a fourth time-frequency resource, a downlink data channel used to carry first emergency service data.

In a process in which the network device sends, to a third terminal by using a third time-frequency resource, a downlink data channel used to carry common service data, if a scheduler of the network device receives a requirement for sending downlink data of a first emergency service to the second terminal, when there is no available idle resource, to ensure that a transmission latency requirement of the first emergency service is met, to be specific, the corresponding downlink data of the first emergency service is sent in time, the network device can re-schedule the third time-frequency resource originally scheduled for sending a common service to the third terminal, to use a part of the third time-frequency resource as the fourth time-frequency resource used to send the first emergency service.

Figure 3:
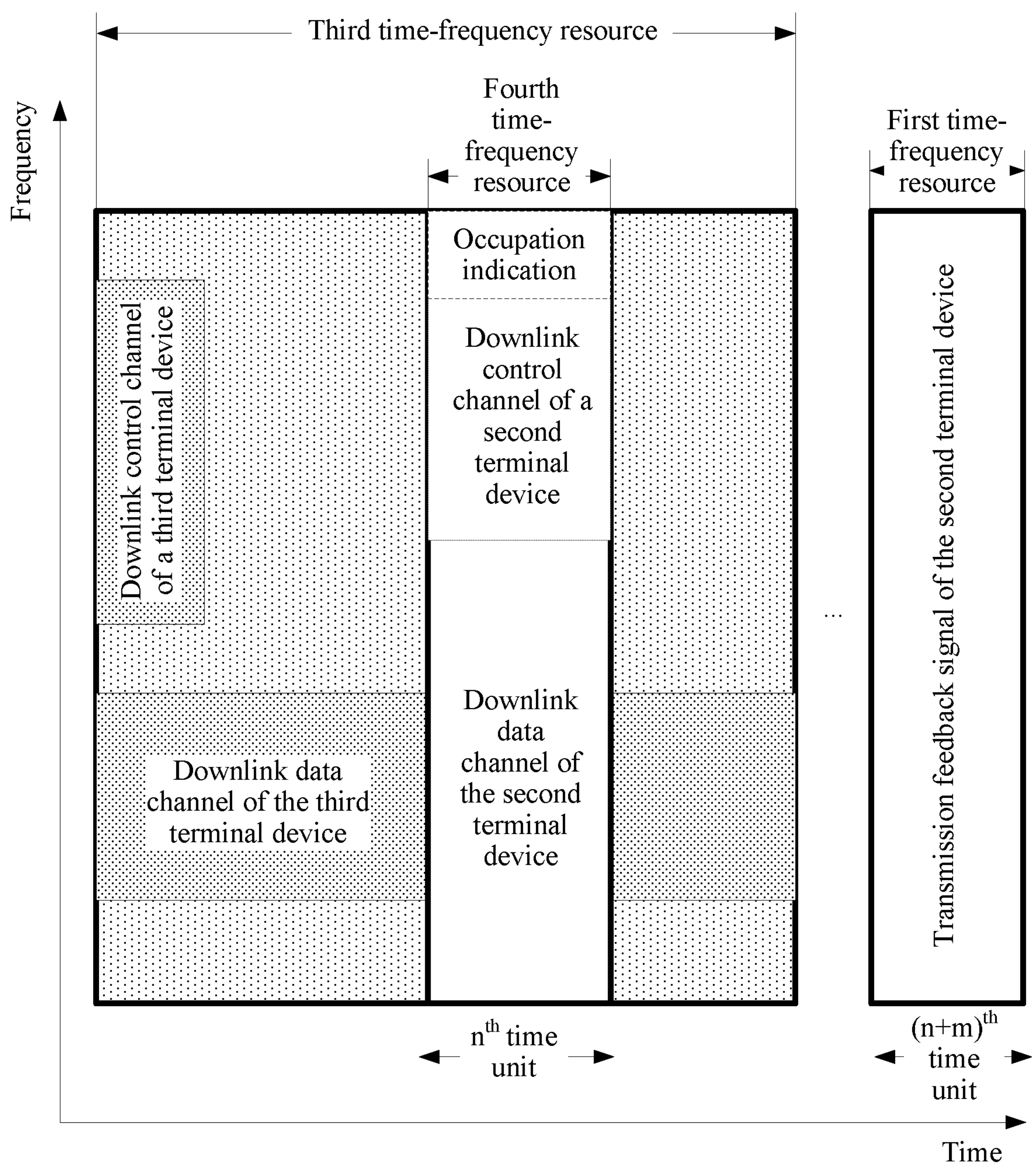
FIG. 3 is a schematic diagram of a location relationship between a third time-frequency resource and a fourth time-frequency resource in this application.

For example, as shown in FIG. 3, the third time-frequency resource is a time-frequency resource originally scheduled for sending the common service to the third terminal, and an $n^{th}$ time unit is the fourth time-frequency resource. The network device may send the first emergency service to the second terminal in the $n^{th}$ time unit through time-frequency resource re-scheduling. It should be noted herein that in the example shown in FIG. 3, the fourth time-frequency resource occupies the entire frequency domain resource. In actual use, the fourth time-frequency resource may occupy only some frequency domain positions in the $n^{th}$ time unit, and the frequency domain positions may be continuous or discontinuous. This is not limited in this application.

Step 202: A first terminal determines a to-be-sent first signal.

The first terminal first determines that the first signal needs to be sent. The first signal may include an SR signal, a transmission feedback signal, or the like. It should be noted that the first terminal may merely determine that the first signal needs to be sent, but the first signal may not be generated yet.

For example, after receiving downlink data sent by the network device, the first terminal needs to send a transmission feedback signal of the downlink data to the network device. Therefore, after receiving the downlink data, the first terminal may determine that the transmission feedback signal needs to be sent, and the transmission feedback signal is the to-be-sent first signal.

For another example, when the first terminal needs to send uplink data, the first terminal needs to send an SR signal to the network device, to request the network device to schedule a time-frequency resource used to send the uplink data. Therefore, after generating a requirement for sending the uplink data, the first terminal may determine that the SR signal needs to be sent, and the SR signal is the to-be-sent first signal.

It should be noted herein that when the first terminal determines that the first signal needs to be sent, the first signal may not be generated yet. For example, when the first signal is the transmission feedback signal, the first terminal may determine, when receiving the downlink data, that the transmission feedback signal needs to be sent, but the first terminal can determine, based on a decoding result only after receiving, demodulating, and decoding the downlink data, whether a corresponding feedback signal is correctly generated.

Step 203: The first terminal determines the fourth time-frequency resource. The fourth time-frequency resource used by the network device is a time-frequency resource used by the network device to transmit the first emergency service.

Because the network device may use downlink control information to instruct the first terminal to send an uplink signal and receive a downlink signal and indicate a time-frequency resource used to send the uplink signal or used to send the downlink signal, the first terminal may continuously monitor the downlink control information, and determine the fourth time-frequency resource based on the downlink control information.

For example, when the network device re-schedules the fourth time-frequency resource for the first emergency service, to reduce impact on transmission reliability of the common service, the network device may send a re-scheduling signal or re-scheduling signaling. The re-scheduling signal or the re-scheduling signaling may be used to indicate that the fourth time-frequency resource has been re-scheduled to the second terminal for transmitting the first emergency service to the second terminal. The first terminal may continuously monitor the re-scheduling signal or the re-scheduling signaling.

For example, as shown in FIG. 3, in addition to a control channel used to schedule the second terminal to receive a data channel and a time-frequency resource block used to send the data channel of the second terminal, the fourth time-frequency resource may include a time-frequency resource block used to transmit an occupation indication, and the occupation indication is used to indicate that the fourth time-frequency resource is re-scheduled to the second terminal for the first emergency service. The first terminal may continuously monitor whether there is the occupation indication, to determine a time domain position and a frequency domain position of the fourth time-frequency resource.

Step 204: The first terminal determines a first time-frequency resource based on the fourth time-frequency resource.

After receiving the first emergency service sent by the network device by using the fourth time-frequency resource, the second terminal sends the transmission feedback signal on a corresponding time-frequency resource having a predetermined time interval with the fourth time-frequency resource. Therefore, a frequency domain position of the corresponding time-frequency resource may be agreed on in a standard in advance or may be obtained by the second terminal by scheduling a downlink control channel for current downlink transmission. The first terminal may obtain the frequency domain position of the corresponding time-frequency resource by using a criterion agreed on in the standard in advance or by reading a downlink control channel that is in the fourth time-frequency resource and that is used to schedule the second terminal to receive the downlink data. If the first signal can be generated when the corresponding time-frequency resource arrives, the first terminal may use the corresponding time-frequency resource as the first time-frequency resource.

For example, the first signal is a transmission feedback signal of a second emergency service. When the first terminal receives, in an $(n+k)^{th}$ time unit, the second emergency service delivered by the network device, the first terminal needs to send the transmission feedback signal of the second emergency service only in an $(n+k+m)^{th}$ time unit based on scheduling performed by the network device. The transmission feedback signal of the second emergency service is the first signal. When the second terminal sends a transmission feedback signal of the first emergency service in an $(n+m)^{th}$ time unit, if the first terminal can generate the transmission feedback signal of the second emergency service in an $(m-k)^{th}$ time unit, in other words, the first terminal can generate the transmission feedback signal of the second emergency service before the $(n+m)^{th}$ time unit, the first terminal may use the $(n+^{m})^{th}$ time unit as the first time-frequency resource.

For example, the first signal is an SR signal of the first terminal. When the second network device sends the transmission feedback signal of the first emergency service in the $(n+m)^{th}$ time unit, if the first terminal can generate the SR signal before the $(n+m)^{th}$ time unit, the first terminal may use the $(n+m)^{th}$ time unit as the first time-frequency resource.

It should be noted herein that a sequence of performing step 202 and steps 203 and 204 is not limited in this application. The first terminal may perform steps 203 and 204 before step 202, or may perform step 202 before steps 203 and 204.

Step 205: The first terminal sends the first signal by using the first time-frequency resource, where the first signal is orthogonal to a second signal in the first time-frequency resource.

After determining the first time-frequency resource, the first terminal may send the first signal by using the first time-frequency resource. Because the first time-frequency resource may also be used to send the second signal, the first signal may be orthogonal to the second signal in the first time-frequency resource, to avoid mutual interference between the first signal and the second signal.

The first signal is orthogonal to the second signal in the first time-frequency resource in a plurality of manners. If the second signal is a sequence signal, the network device may allocate a sequence signal that is orthogonal to the second signal to the first terminal and use the sequence signal as the first signal, so that the first signal is orthogonal to the second signal in the first time-frequency resource.

For example, the first signal is the transmission feedback signal of the second emergency service, and the second signal is the transmission feedback signal of the first emergency service. The first signal may be a first sequence pre-allocated by the network device to the first terminal for dedicated use, the second signal may be a second sequence pre-allocated by the network device to the second terminal for dedicated use, and the first sequence is orthogonal to the second sequence.

The first terminal may alternatively perform extension by using a CDM code, so that the first signal is orthogonal to the second signal in the first time-frequency resource.

Figure 4:
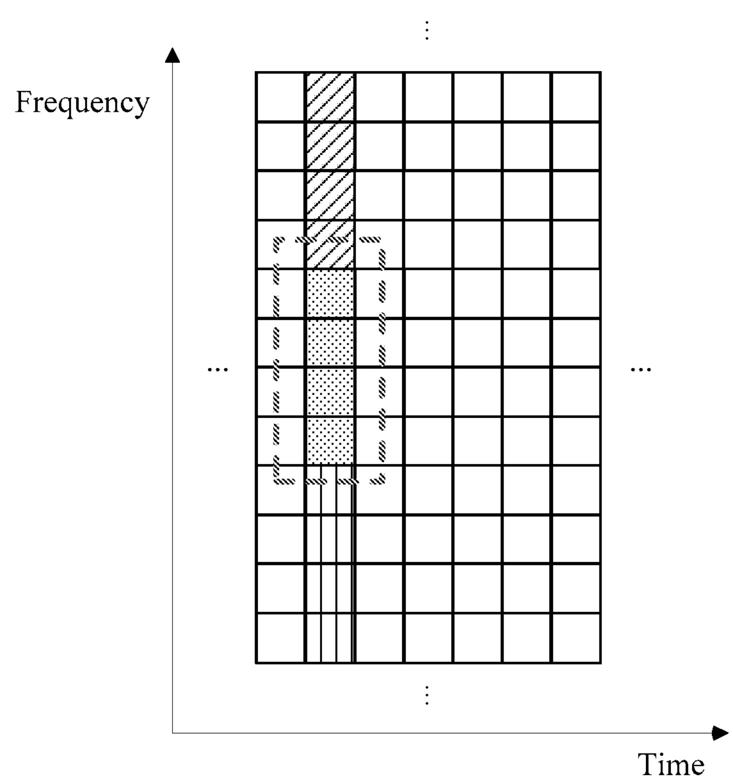
FIG. 4 is a schematic diagram of a first time-frequency resource in this application.
Figure 5:
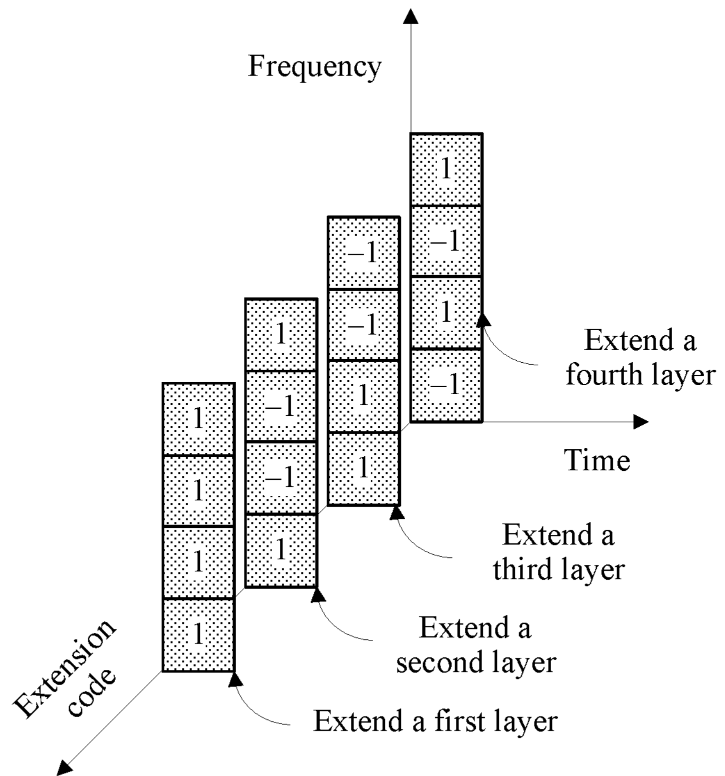
FIG. 5 is a schematic diagram of an extension manner for any group of REs in this application.

For example, the first time-frequency resource may be shown in FIG. 4. Each small block may represent one resource element (RE), four REs filled with a same pattern may form a group, and each group of REs may perform extension by using different CDM codes to carry different signals. A manner in which any group of REs performs extension by using different CDM codes may be shown in FIG. 5. Signals that can be carried by each group of REs may be extended to four layers by using different extension codes.

In an example, a first layer and a second layer can be extended to carry at least a DMRS pilot of the second terminal. The first terminal learns, by monitoring a physical downlink control channel (for example, listening DMRS transmission configured by the network device for the second terminal) or receiving upper-layer signaling (for example, the network device notifies that code resources of a third layer and a fourth layer are vacant at a time-frequency location corresponding to another user DMRS in a specific time range), that the third layer and the fourth layer are extended to be vacant. In this case, the first terminal extends the to-be-sent first signal (for example, an SR signal or a transmission feedback signal) by using a CDM code at the extended third layer and/or the extended fourth layer and then transmits the to-be-sent first signal.

In another example, a first layer and a second layer can be extended to carry at least a DMRS pilot of the second terminal, and a third layer and a fourth layer are extended to carry an SRS sent by the terminal to the network device in a cell. The first terminal may learn, by monitoring a physical downlink control channel or receiving upper-layer signaling (for example, the network device instructs the terminal to send a time-frequency resource and a code resource of the SRS), that the third layer and the fourth layer are extended to send the SRS. The first terminal extends a to-be-sent SR signal or a to-be-sent ACK/NACK signal by using a CDM code at the extended third layer and/or the extended fourth layer and then transmits the to-be-sent SR signal or the to-be-sent ACK/NACK signal.

According to the solution provided in this embodiment, after generating a requirement for sending an uplink signal, the first terminal can independently use an additional uplink resource for signal sending, so that a time from occurrence of an uplink data transmission requirement to an actual start of uplink data transmission can be effectively reduced.

Figure 6:
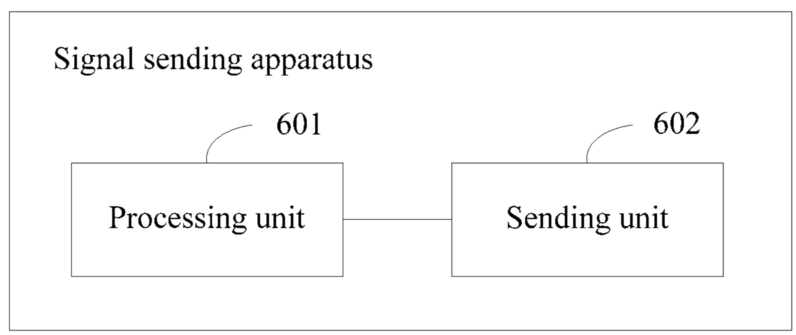
FIG. 6 is a schematic structural diagram of an embodiment of a signal sending apparatus in this application.

FIG. 6 is a schematic structural diagram of an embodiment of a signal sending apparatus in this application. The signal sending apparatus may be disposed on the foregoing terminal, or may be the foregoing terminal.

As shown in FIG. 6, the signal sending apparatus may include a processing unit and a sending unit.

The processing unit is configured to determine a to-be-sent first signal and a first time-frequency resource, where some or all of the first time-frequency resource are second time-frequency resources, and the second time-frequency resource is a time-frequency resource used to send a second signal. The sending unit is configured to send the first signal by using the first time-frequency resource, where the first time-frequency resource includes an idle time-frequency resource that is not occupied by the second signal; and/or the first time-frequency resource includes a common time-frequency resource occupied by the second signal, and the first signal is orthogonal to the second signal in the common time-frequency resource.

Optionally, both the first signal and the second signal are sequence signals, and a third signal is orthogonal to a fourth signal. The third signal is a part that is of the first signal and that is sent by the first terminal on the common time-frequency resource, and the fourth signal is a part that is of the second signal and that is sent by a second terminal on the common time-frequency resource.

Optionally, the first signal is a signal obtained after extension is performed by using a first code division multiplexing (CDM) code, the second signal is a signal obtained after extension is performed by using a second CDM code, and the first CDM code and the second CDM code are orthogonal codes.

Optionally, a signal type of the first signal includes at least one of an acknowledgement (ACK), a negative acknowledgement (NACK), and a scheduling request signal.

Optionally, a signal type of the second signal includes at least one of an acknowledgement (ACK), a negative acknowledgement (NACK), a scheduling request signal, a sounding reference signal (SRS), and a pilot signal.

Optionally, the second signal is a signal sent by the first terminal, and the signal type of the first signal is different from the signal type of the second signal; and/or the second signal is a signal sent by the second terminal, and the signal type of the first signal is the same as or different from the signal type of the second signal.

Figure 7:
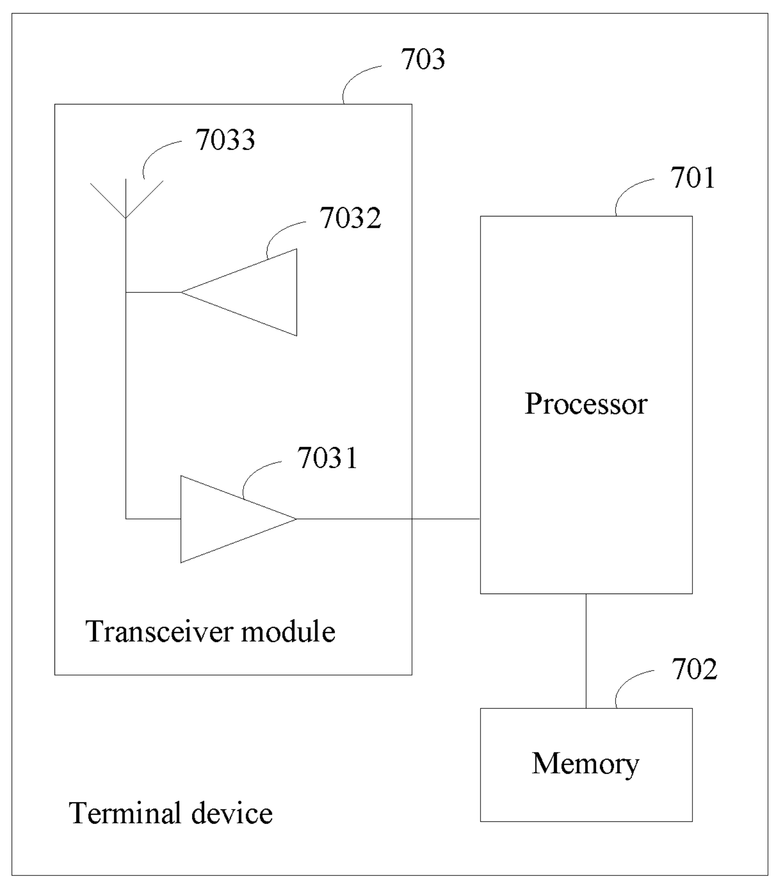
FIG. 7 is a schematic structural diagram of an embodiment of a terminal in this application.

FIG. 7 is a schematic structural diagram of an embodiment of a terminal in this application. The terminal may be configured to perform the data transmission method in the foregoing embodiments.

As shown in FIG. 7, the terminal may include a processor 701, a memory 702, and a transceiver module 703.

The transceiver module 703 may include components such as a receiver 7031, a transmitter 7032, and an antenna 7033. The terminal may further include more or fewer components, or combine some components, or have different component arrangements. This is not limited in this application.

The processor 701 is a control center of the terminal, is connected to each part of the entire terminal by using various interfaces and lines, and performs various functions of the terminal and/or data processing by running or executing a software program and/or a module that are/is stored in the memory 702 and invoking data stored in the memory 702. The processor 701 may be a central processing unit (CPU), a network processor (NP), or a combination of a CPU and an NP. The processor 701 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

The memory 702 may include a volatile memory, such as a random access memory (RAM); or may include a non-volatile memory, such as a flash memory, a hard disk drive (HDD), or a solid state drive (SSD). The memory 702 may alternatively include a combination of the foregoing types of memories. The memory 702 may store a program or code, and the processor 701 in the terminal may implement a function of the terminal by executing the program or the code.

The transceiver module 703 is configured to establish a communication channel, so that the terminal is connected to a receiving device by using the communication channel, to implement data transmission between terminals. The transceiver module 703 may include a communications module such as a wireless local area network (WLAN) module, a Bluetooth module, or a baseband module, and a radio frequency (RF) circuit corresponding to the communications module, and is configured to perform wireless local area network communication, Bluetooth communication, infrared communication, and/or cellular communications system communication, such as Wideband Code Division Multiple Access (WCDMA) and/or High Speed Downlink Packet Access (HSDPA). The transceiver module 703 is configured to control communication between all the components in the terminal, and may support direct memory access.

In different implementations of this application, various transceiver modules 703 in the transceiver module 703 generally exist in a form of an integrated circuit chip, and may be selectively combined without a need to include all transceiver modules 703 and corresponding antenna groups. For example, the transceiver module 703 may include only a baseband chip, a radio frequency chip, and a corresponding antenna, to provide a communication function in a cellular communications system. The terminal may be connected to a cellular network or the Internet by using a wireless communication link established by the transceiver module 703, for example, wireless local area network access or WCDMA access. In some optional implementations of this application, the communications module such as the baseband module in the transceiver module 703 may be integrated into the processor, typically, such as an APQ+MDM series of platform provided by Qualcomm. The radio frequency circuit is configured to: receive and send a signal in an information receiving/transmitting process or a call process. For example, after receiving downlink information from the terminal, the radio frequency circuit sends the downlink information to the processor 701 for processing; and in addition, sends related uplink data to the terminal. Generally, the radio frequency circuit includes a well-known circuit used to perform these functions, and includes but is not limited to an antenna system, a radio frequency transceiver, one or more amplifiers, a tuner, one or more oscillators, a digital signal processor, a codec chip set, a subscriber identity module (SIM) card, a memory, and the like.

In addition, the radio frequency circuit may further communicate with a network and another device through wireless communication. The wireless communication may use any communications standard or protocol, including but not limited to the Global System for Mobile Communications (GSM), a general packet radio service (GPRS), Code Division Multiple Access (CDMA), Wideband Code Division Multiple Access (WCDMA), a High Speed Uplink Packet Access (HSUPA) technology, Long Term Evolution (Long Term Evolution, LTE), an email, a short message service (SMS), and the like.

In this embodiment of this application, the processor 701 determines a to-be-sent first signal and a first time-frequency resource, and the transceiver module 703 is configured to send the first signal by using the first time-frequency resource. The processing unit in the foregoing embodiment may be implemented by the processor 701, and the sending unit in the foregoing embodiment may be implemented by the transceiver module 703 or implemented by the processor 701 by controlling the transceiver module 703.

In specific implementation, the present invention further provides a computer storage medium, where the computer storage medium may store a program, and when the program is executed, some or all of the steps of the embodiments of the signal sending method provided in the present invention may be performed. The foregoing storage medium may include a magnetic disk, an optical disc, a read-only memory (ROM), a random access memory (RAM), or the like.

A person skilled in the art may clearly understand that, the technologies in the embodiments of the present invention may be implemented by software in addition to a necessary general hardware platform. Based on such an understanding, the technical solutions in the embodiments of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, a network device, or the like) to perform the methods described in the embodiments or some parts of the embodiments of the present invention.

For same or similar parts in the embodiments in this specification, mutual reference may be made between these embodiments. Especially, apparatus and terminal embodiments are basically similar to a method embodiment, and therefore are described briefly; for related parts, refer to descriptions in the method embodiment.

The foregoing descriptions are implementations of the present invention, but are not intended to limit the protection scope of the present invention.

What is claimed is:

1. A signal sending method, comprising:

determining, by a first terminal, a first signal to be sent;

determining, by the first terminal, a first time-frequency resource, wherein some or all of the first time-frequency resource are second time-frequency resources, and wherein the second time-frequency resource is a time-frequency resource used to send a second signal; and sending, by the first terminal, the first signal by using the first time-frequency resource, wherein the first time-frequency resource comprises at least one of the following:

an idle time-frequency resource that is not occupied by the second signal; or a common time-frequency resource occupied by the second signal, wherein the first signal is orthogonal to the second signal in the common time-frequency resource, wherein both the first signal and the second signal are sequence signals, and wherein a third signal is orthogonal to a fourth signal, wherein the third signal is a part that is of the first signal and that is sent by the first terminal on the common time-frequency resource, and wherein the fourth signal is a part that is of the second signal and that is sent by a second terminal on the common time-frequency resource.

2. The method according to claim 1, wherein the first signal is a signal obtained after extension is performed by using a first code division multiplexing (CDM) code, wherein the second signal is a signal obtained after extension is performed by using a second CDM code, and wherein the first CDM code and the second CDM code are orthogonal codes.

3. The method according to claim 1, wherein a signal type of the first signal comprises at least one of an acknowledgement (ACK), a negative acknowledgement (NACK), and a scheduling request signal.

4. The method according to claim 3, wherein a signal type of the second signal comprises at least one of an ACK, a NACK, a scheduling request signal, a sounding reference signal (SRS), and a pilot signal.

5. The method according to claim 4, wherein the second signal is a signal sent by the first terminal, and wherein the signal type of the first signal is different from the signal type of the second signal; or the second signal is a signal sent by the second terminal, and wherein the signal type of the first signal is the same as or different from the signal type of the second signal.

6. A signal sending apparatus, comprising:

at least one processor; and a non-transitory computer-readable storage medium coupled to the at least one processor and storing programming instructions for execution by the at least one processor, wherein the programming instructions instruct the at least one processor to:

determine a first signal to be sent;

determine a first time-frequency resource, wherein some or all of the first time-frequency resource are second time-frequency resources, and wherein the second time-frequency resource is a time-frequency resource used to send a second signal; and send the first signal by using the first time-frequency resource, wherein the first time-frequency resource comprises at least one of the following: an idle time-frequency resource that is not occupied by the second signal; or a common time-frequency resource occupied by the second signal, wherein the first signal is orthogonal to the second signal in the common time-frequency resource, wherein both the first signal and the second signal are sequence signals, and wherein a third signal is orthogonal to a fourth signal, wherein the third signal is a part that is of the first signal and that is sent by a first terminal on the common time-frequency resource, and wherein the fourth signal is a part that is of the second signal and that is sent by a second terminal on the common time-frequency resource.

7. The apparatus according to claim 6, wherein
the first signal is a signal obtained after extension is performed by using a first code division multiplexing (CDM) code, wherein the second signal is a signal obtained after extension is performed by using a second CDM code, and wherein the first CDM code and the second CDM code are orthogonal codes.

8. The apparatus according to claim 6, wherein
a signal type of the first signal comprises at least one of an acknowledgement (ACK), a negative acknowledgement (NACK), and a scheduling request signal.

9. The apparatus according to claim 8, wherein
a signal type of the second signal comprises at least one of an ACK, a NACK, a scheduling request signal, a sounding reference signal (SRS), and a pilot signal.

10. The apparatus according to claim 9, wherein
the second signal is a signal sent by the first terminal, and wherein the signal type of the first signal is different from the signal type of the second signal; or
the second signal is a signal sent by the second terminal, and wherein the signal type of the first signal is the same as or different from the signal type of the second signal.

11. A non-transitory computer-readable storage medium, comprising executable instructions, wherein the executable instructions, when executed by a computer, cause the computer to:
determine a first signal to be sent;
determine a first time-frequency resource, wherein some or all of the first time-frequency resource are second time-frequency resources, and wherein the second time-frequency resource is a time-frequency resource used to send a second signal; and
send the first signal by using the first time-frequency resource, wherein the first time-frequency resource comprises at least one of the following: an idle time-frequency resource that is not occupied by the second signal; or a common time-frequency resource occupied by the second signal, wherein the first signal is orthogonal to the second signal in the common time-frequency resource, wherein
both the first signal and the second signal are sequence signals, and wherein a third signal is orthogonal to a fourth signal, wherein
the third signal is a part that is of the first signal and that is sent by a first terminal on the common time-frequency resource, and
wherein the fourth signal is a part that is of the second signal and that is sent by a second terminal on the common time-frequency resource.

12. The non-transitory computer-readable storage medium according to claim 11, wherein
the first signal is a signal obtained after extension is performed by using a first code division multiplexing (CDM) code, wherein the second signal is a signal obtained after extension is performed by using a second CDM code, and wherein the first CDM code and the second CDM code are orthogonal codes.

13. The non-transitory computer-readable storage medium according to claim 11, wherein
a signal type of the first signal comprises at least one of an acknowledgement (ACK), a negative acknowledgement (NACK), and a scheduling request signal.

14. The non-transitory computer-readable storage medium according to claim 13, wherein
a signal type of the second signal comprises at least one of an ACK, a NACK, a scheduling request signal, a sounding reference signal (SRS), and a pilot signal.

15. The non-transitory computer-readable storage medium according to claim 14, wherein
the second signal is a signal sent by the first terminal, and wherein the signal type of the first signal is different from the signal type of the second signal; or
the second signal is a signal sent by the second terminal, and wherein the signal type of the first signal is the same as or different from the signal type of the second signal.

* * * * *